(12) United States Patent
Conklin

(10) Patent No.: US 9,883,666 B1
(45) Date of Patent: Feb. 6, 2018

(54) FLYING INSECT TRAP

(71) Applicant: David A. Conklin, Livingston, NJ (US)

(72) Inventor: David A. Conklin, Livingston, NJ (US)

( * ) Notice: Subject to any disclaimer, the term of this patent is extended or adjusted under 35 U.S.C. 154(b) by 285 days.

(21) Appl. No.: 14/756,495

(22) Filed: Sep. 10, 2015

Related U.S. Application Data

(60) Provisional application No. 62/071,134, filed on Sep. 15, 2014.

(51) Int. Cl.
| | | |
|---|---|---|
| *A01M 1/04* | (2006.01) | |
| *A01M 1/06* | (2006.01) | |
| *A01M 1/08* | (2006.01) | |
| *A01M 1/14* | (2006.01) | |
| *A01M 1/10* | (2006.01) | |

(52) U.S. Cl.
CPC .............. *A01M 1/145* (2013.01); *A01M 1/04* (2013.01); *A01M 1/06* (2013.01); *A01M 1/08* (2013.01); *A01M 1/106* (2013.01)

(58) Field of Classification Search
CPC A01M 1/04; A01M 1/06; A01M 1/08; A01M 1/106; A01M 1/145
USPC .......... 43/113, 114, 122, 124, 132.1
See application file for complete search history.

(56) References Cited

U.S. PATENT DOCUMENTS

| 4,117,624 | A | 10/1978 | Phillips | |
|---|---|---|---|---|
| 5,950,355 | A * | 9/1999 | Gilbert | A01M 1/145 43/113 |
| 5,974,727 | A | 11/1999 | Gilbert et al. | |
| 6,393,759 | B1 | 5/2002 | Brown et al. | |
| 6,397,515 | B1 | 6/2002 | Brown et al. | |
| 6,959,510 | B1 | 11/2005 | Nelson et al. | |
| 8,341,874 | B2 * | 1/2013 | Studer | A01M 1/145 43/113 |
| 8,572,890 | B1 * | 11/2013 | Lark | A01M 1/145 43/113 |

OTHER PUBLICATIONS

Hollingsworth J. et al., "Effect of Components on Insect Light Trap Performance," Transactions of the American Society of Agricultural Engineers, vol. 15, No. 5, pp. 924-927.
"Electronics, Adhesive Offer Sanitary Fly Control," Competitive Literature Review, Publication: Pest Control, Nov. 1992.

\* cited by examiner

*Primary Examiner* — David Parsley

(57) ABSTRACT

An electronic flying insect trap apparatus having a housing topped by an aperture with sufficient openings as to allow flying insects to pass through it and side apertures of the apparatus and a bottom plate, the housing and bottom plate having sufficient openings as to allow air to pass therethrough and disseminate a scent. At least one light positioned below the top aperture. A truncated conical collar below the light. At least one fan positioned below the collar. A tray containing sticky adhesive disposed on the upper surface of a disposable sheet positioned below the fan. At least one motion detector is in communication with the fan.

5 Claims, 24 Drawing Sheets

Overview Housing

FIRST SIDE

BACK SIDE

SECOND SIDE

TOP ELEVATIONAL VIEW

BOTTOM PLATE

PERSPECTIVE VIEW OF BACK AND SECOND SIDES

HOUSING ASSEMBLY (NON-ELECTRICAL)

HOUSING ASSEMBLY
EXPLODED VIEW

TOP ELEVATIONAL VIEW WITHOUT GRILLE

TOP ELEVATIONAL VIEW OF FIG. 10 WITH HOUSING REMOVED

TOP ELEVATIONAL
VIEW WITHOUT
UV LIGHT BULB

TOP ELEVATIONAL VIEW
WITHOUT FAN SHOWING
TRUNCATED CONICAL
MIRRORED REFLECTIVE COLLAR

TOP ELEVATIONAL VIEW
WITH COLLAR REMOVED
SHOWING VENTED FAN
MOUNTING PLATE

TOP ELEVATIONAL VIEW WITHOUT FAN MOUNTING PLATE SHOWING TRAY

TOP ELEVATIONAL VIEW WITHOUT TRAY SHOWING BASE PLATE WITH TRAY RAILS AND OPTIONAL CORRUGATION OF SURFACE

TOP ELEVATIONAL VIEW OF HOUSING WITHOUT INTERNAL ELEMENTS

FRONT ELEVATIONAL VIEW
WITHOUT HOUSING SHOWING
INTERNAL ELEMENTS

SIDE ELEVATIONAL VIEW FROM SECOND SIDE WITHOUT HOUSING SHOWING FAN MOUNTING PLATE WITH OPTIONAL VENT VENT PLACEMENT

ROTATED BACK ELEVATIONAL VIEW OF FIG. 18

PERSPECTIVE VIEW OF

TOP ELEVATIONAL VIEW
OF TRAY

PERSPECTIVE VIEW OF
FIG. 21 SHOWING HANDLE
ON DRAW

PERSPECTIVE VIEW OF
FIG. 21 SHOWING PAD
STORAGE AREA

FLYING INSECT TRAP

BACKGROUND OF THE INVENTION

Field of the Invention

The present disclosure relates to electronic flying insect traps, and more particularly to a self-powered and/or remote-powered electronic flying insect traps which uses ultraviolet light and nectar scent to attract flying insects to an enclosure, and entrapped said flying insects upon a sticky surface therein having been sucked into said enclosure via a fan.

Background

Flying insects are a source of pathogens and bacteria that carry many diseases. Flying insects are in part attracted by ultraviolet light and nectar scent. Flying insects are found in and around human habitations, and elsewhere.

Many attempts have been made to eliminate flying insects in proximity to people, with mixed results. Attempts have been made to electrocute flies, so called "bug zappers". These devices attract flies to a source of light, and electrically charged wires in proximity to the lights serve to electrocute the flies upon contact with the electrically charged wires. Bug zappers explode insects and thus are not recommend for use indoors.

Flypaper is the most common flying insect elimination device. Flying insects are attracted to the area by sight, sound and/or smell, and become stuck on the flypaper. Flypaper is unsightly, and difficult to handle.

Flying insect elimination devices involving lights and fly paper located in proximity to the source of light are more effective than fly paper alone. However they quickly become contaminated in the presence of flying insects and are difficult to keep in good working order. Additionally it has been found the fluorescent lights do not attract as many insects as ultraviolet lights and black ultraviolet lights attract more flying insects than blue black ultraviolet lights.

Efforts in the Prior Art

Certain prior U.S. patents have addressed techniques to eliminate flying pests. For example U.S. Pat. No. 5,974,727 issuing to David Gilbert on Nov. 2, 1999 discloses a decorative flying insect trap using light, with fly paper located below the light.

U.S. Pat. No. 4,117,624 issuing to Dennis Phillips on Oct. 3, 1978 discloses an insect trap having a light source having a sticky substance located on a reflective surface positioned behind and below the light source.

Other patents of interest include U.S. Pat. No. 6,959,510 (Nelson, et al.) issued Nov. 1, 2005; U.S. Pat. No. 6,397,515 (Brown, et al.), Jun. 4, 2002; U.S. Pat. No. 6,393,759 (Brown, et al.), May 28, 2002; U.S. Pat. No. 5,974,727 (Gilbert, et al.), Nov. 2, 1999; and U.S. Pat. No. 4,117,624 (Phillips, et al.), Oct. 3, 1978. Other References Include Hollingsworth, J. et al., "Effect of Components on Insect Light Trap Performance," Transactions of the American Society of Agricultural Engineers, vol. 15, No. 5, pp. 924-927; and "Electronics, Adhesive Offer Sanitary Fly Control," Competitive Literature Review, Publication: Pest Control, November 1992.

To date no known patents or resources teach the use of a combination of fans, solid integrated sticky nectar scented pads, motion sensors, ultraviolet lights and universal serial bus technology as taught herein.

SUMMARY OF THE INVENTION

Thus, what is needed, is an more efficient flying insect trap one which has the following: (a) superior passive attractants, such as using black ultraviolet light; (b) using active attractants such as a fan to distribute attractive scent, suck proximate flying insects into the present invention to their deaths; (c) using nectar scent to attract flying insects as a superior passive attractant; (d) using solid not liquid scent attractant sources for superior environmentally safety; (e) integrating sticky pads with scent attraction sources for more efficient use; (f) using mirroring to magnify attractant light; (g) using removable kill zones pads for easy clean up; (h) using gravity locking top plates for easy apparatus cleaning and trap maintenance; (i) using ready available remote power sources to energize the electronic flying insect trap; (j) using integrated sticky pad storage system which is proximate to sticky pad use to promote efficient use of the flying insect trap and (k) using automated activation upon sensing flying insects to promote energy conservation. The present invention incorporates each of the aforementioned elements.

Other objectives and advantages of this invention will become apparent from the following description taken in conjunction with the accompanying drawings wherein certain example embodiments are set forth by way of illustration in the accompanying drawings and description provided herein. The various features of novelty, which characterize this invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
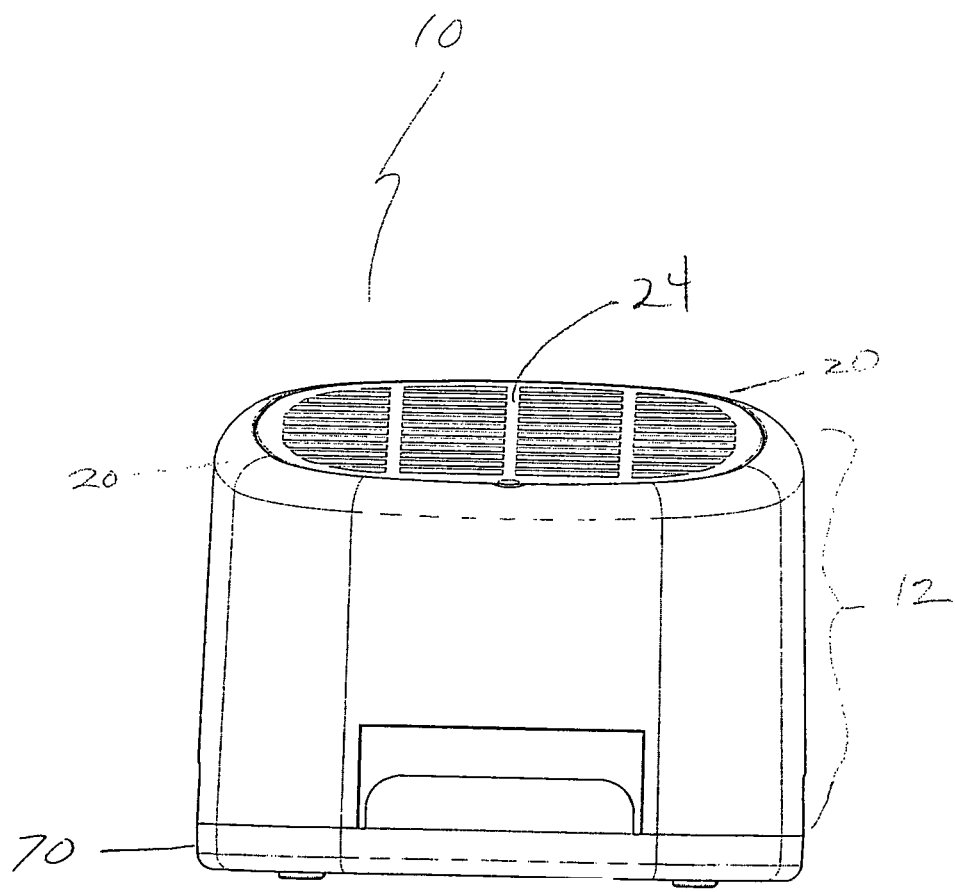
FIG. 1 is a front perspective overview of the preferred embodiment of the current invention with the top grille and tray handle disposed within the housing.

The present disclosure teaches a flying insect trap 10 using two forms of attractant, a light source and a scent source. The light source ??attracts flying insects to the vicinity of the apparatus. The light bulb or tube is removably mounted within a collar, preferably a truncated conical collar with a mirrored surface to enhance the light attractant.

An internally mounted electric fan generates downward airflow through a grille 24 removably mounted in an aperture 22 centrally disposed at the top surface 20 of the external housing 12 disposed upon a bottom plate 70. The housing 12 comprises a first side 30, a second side 40, a front side 50, and a back side 60, preferably unitarily fabricated with internal mounting surfaces.

Figure 2:
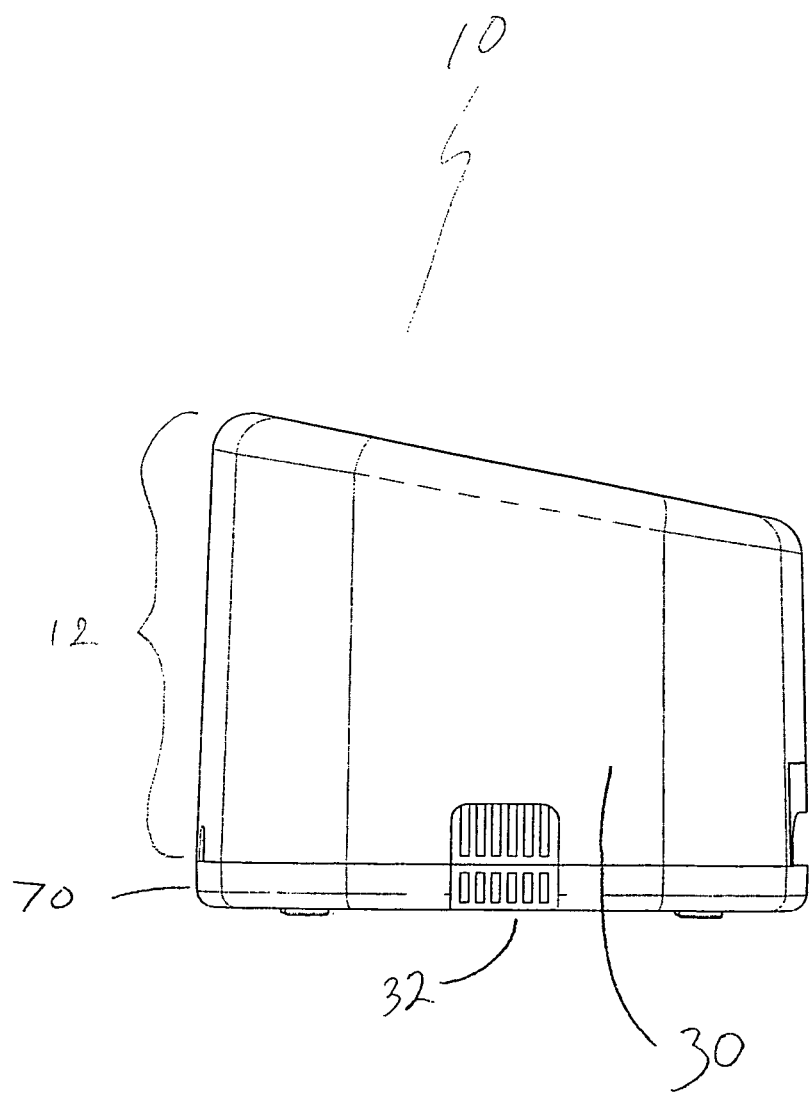
FIG. 2 is an elevational view of the first side of the housing showing the first side exhaust vent.

Referring particularly to FIG. 2, an air-intake grille 24 is seated within the top surface 20 of said housing 12. In the preferred embodiment the grille 24 is seated in a slot (not shown) and secured by a gravity lock for convenient removal of grille 24 without tools or undue force. Said grill 24 is seated in the top surface 20 of the housing 12. In the preferred embodiment, grille 24 is slanted up from the front side 50 to the back side 60, with an optimal slant of between approximately 15 and 45 degrees. In another preferred embodiment, grille 24 may be slanted at multiple angles such as a pyramidal or similar shape (not shown). In the alternative, the grill 24 may be secured with a magnetic lock or at least one conventional fastener (not shown) through an aperture 26 in the grill 24 communicating with a corresponding aperture 28 in the housing.

Figure 3:
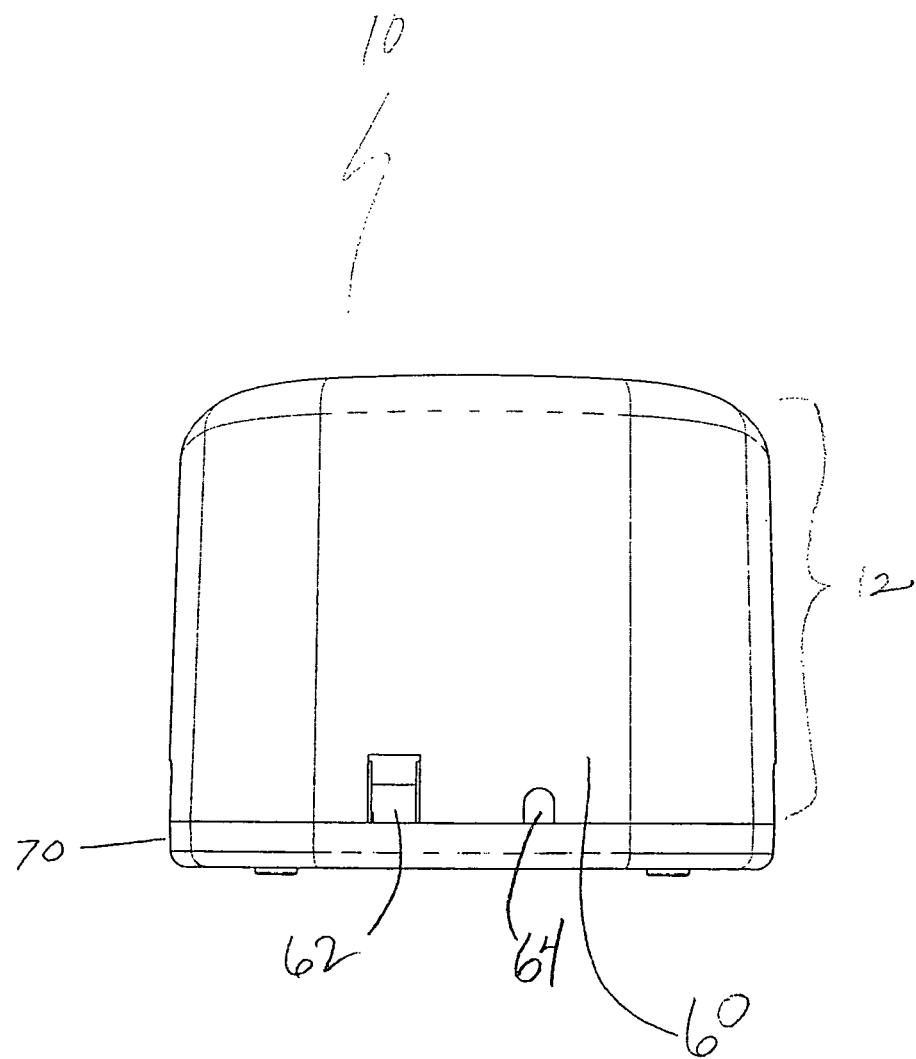
FIG. 3 is an elevational view of the back side of the housing showing preferred power switch and port for cord or USB connector.

Referring to FIG. 3, back side 60 includes openings for a power switch 62 and port 62 for a power cord or USB power system. The power system (not shown) supports internally disposed light bulb 81 and fan subassembly 84.

The light bulb 81 is secured within housing 12 by communication with electrical connection 82. Light attractant is enhanced by an open-ended, truncated conical collar 83 preferably finished with a mirrored surface.

Disposed beneath light 81 is a fan 84. Fan 84 is in communication with motion detector 86. The detector 86 activates fan 84 when upon detecting a flying insect within its range. Fan 84 is secured within housing 12 upon vented fan mount 85. In a preferred embodiment, the vent openings in fan mount 85 should be dimensioned to prevent flying insects from passing therethrough.

Figure 4:
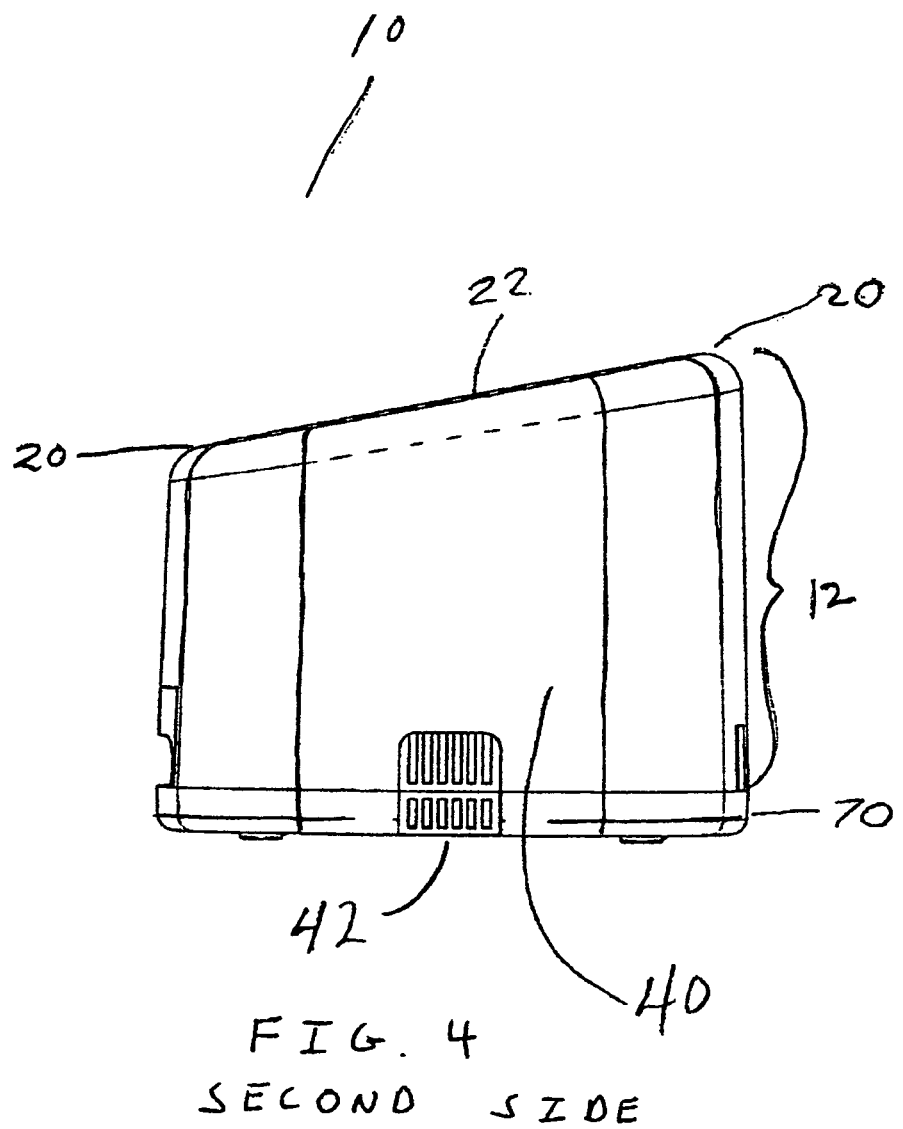
FIG. 4 is an elevational view of the second side of the housing showing the second side exhaust vent.
Figure 5:
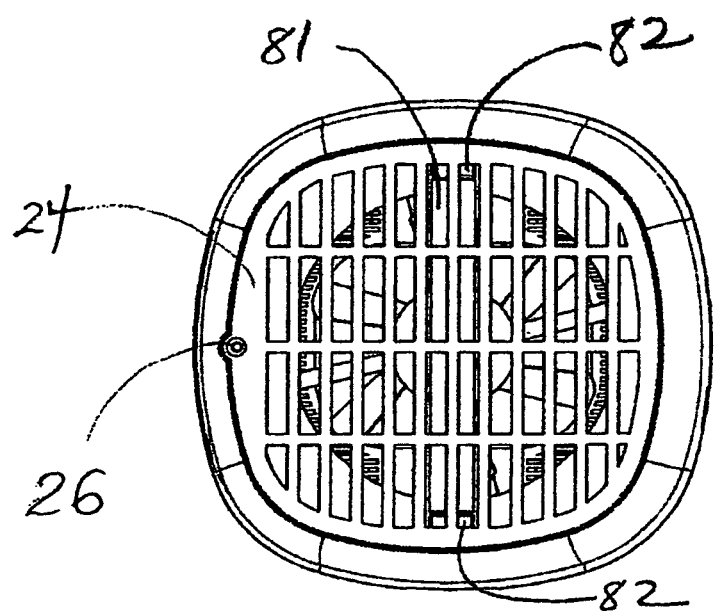
FIG. 5 is a top elevational view of the preferred embodiment showing grille disposed above internal elements.
Figure 6:
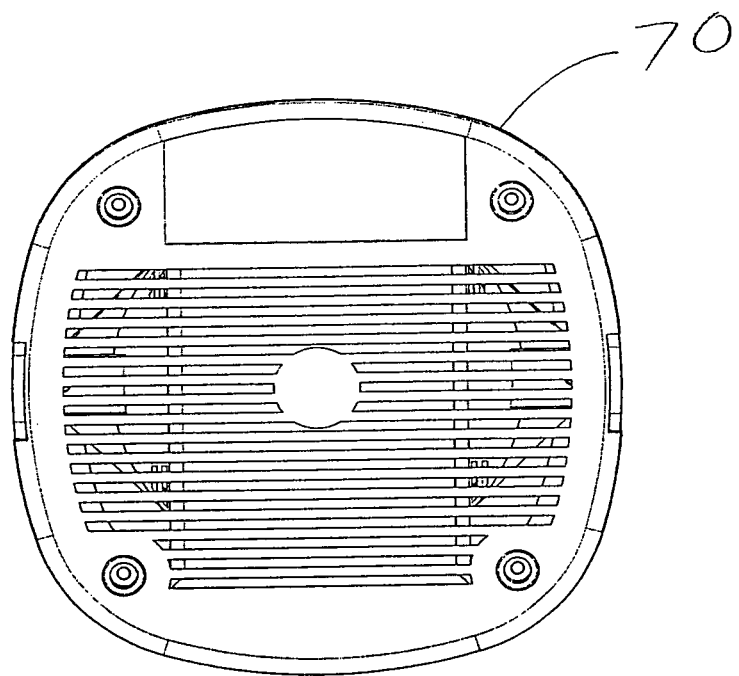
FIG. 6 is an elevational view of the base plate showing four annular support feet and internal elements through optional vent grille in lieu of corrugated solid base plate.
Figure 7:
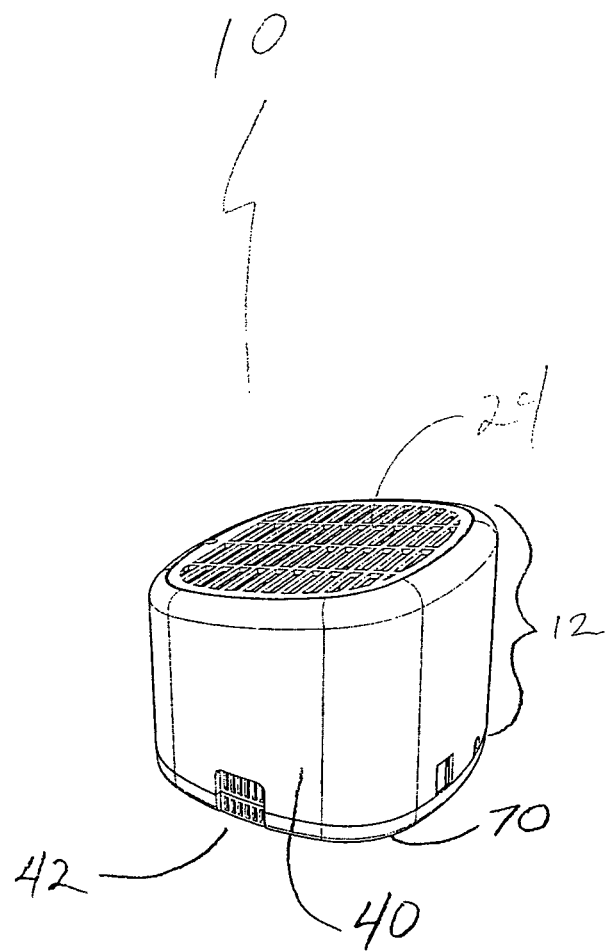
FIG. 7 is a perspective view of back side and second side of the preferred embodiment of FIG. 1.
Figure 8:
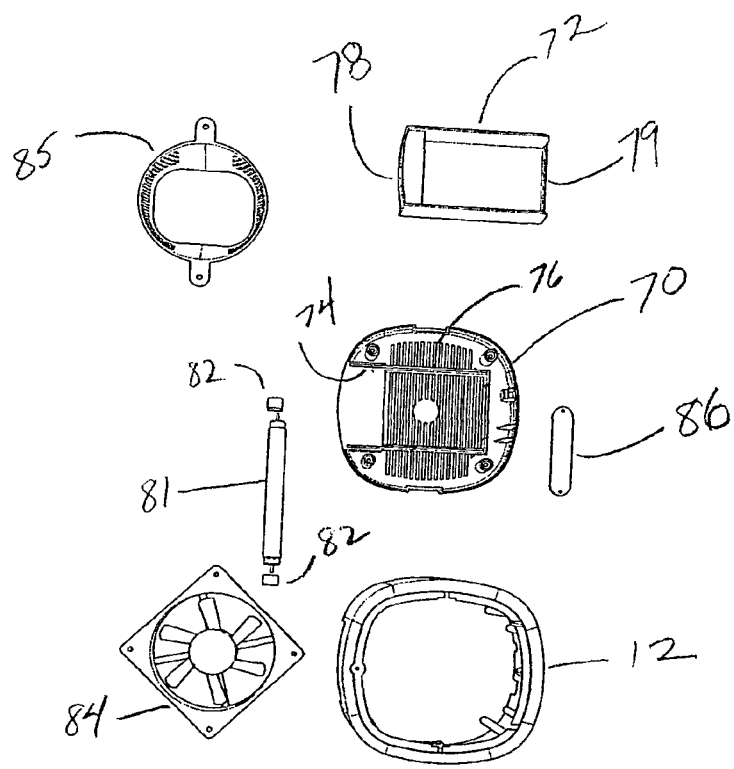
FIG. 8 is an elevational view of non-electrical housing assembly elements.
Figure 8:
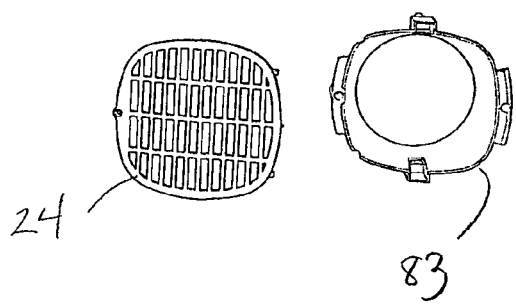
Figure 9:
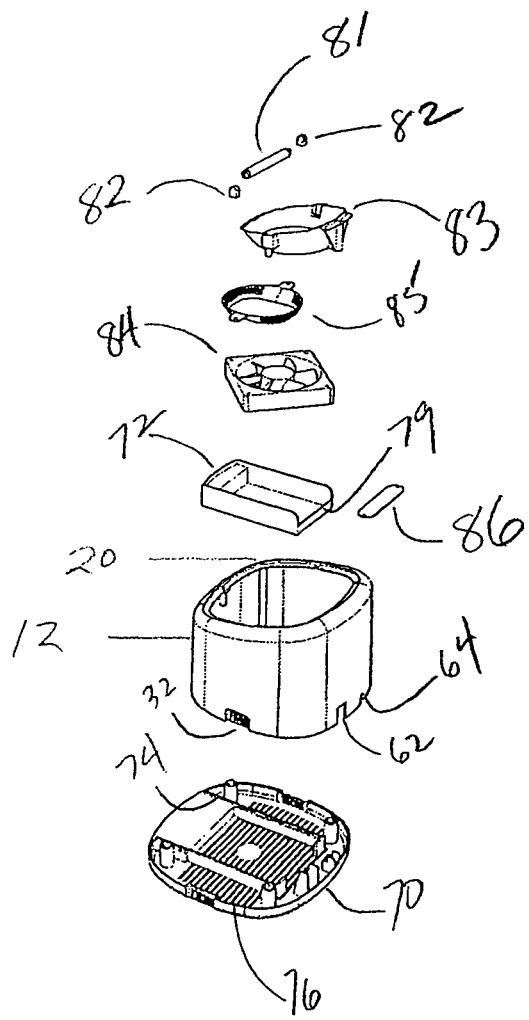
FIG. 9 is an exploded view of the housing assembly elements of FIG. 8.

As best seen in FIGS. 2 and 4, the first side 30 of housing 12 includes a first exhaust vent grille 32, and the second side 40 includes a second exhaust 42. The first exhaust vent 32 and second exhaust grille 42 dissipate the heat generated by the ultraviolet light and airflow created by the internal fan subassembly 84, and dissipate the scent given off by disposable sticky pad (not shown) placed in tray 72. The openings in the first exhaust grille 32 and second exhaust grille 42 must be dimensioned sufficiently small as to prevent flying insects that have not yet affixed to the disposable adhesive pad in tray 72 from escaping from the housing.

Figure 10:
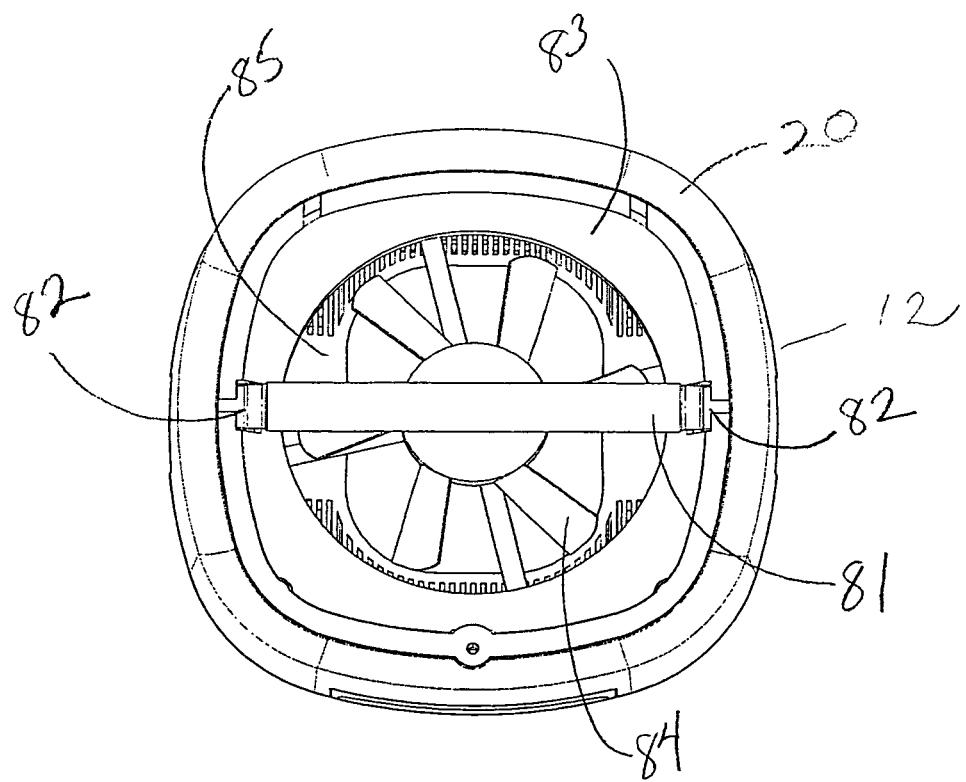
FIG. 10 is a top elevational view of FIG. 5 with intake grille removed.
Figure 10A:
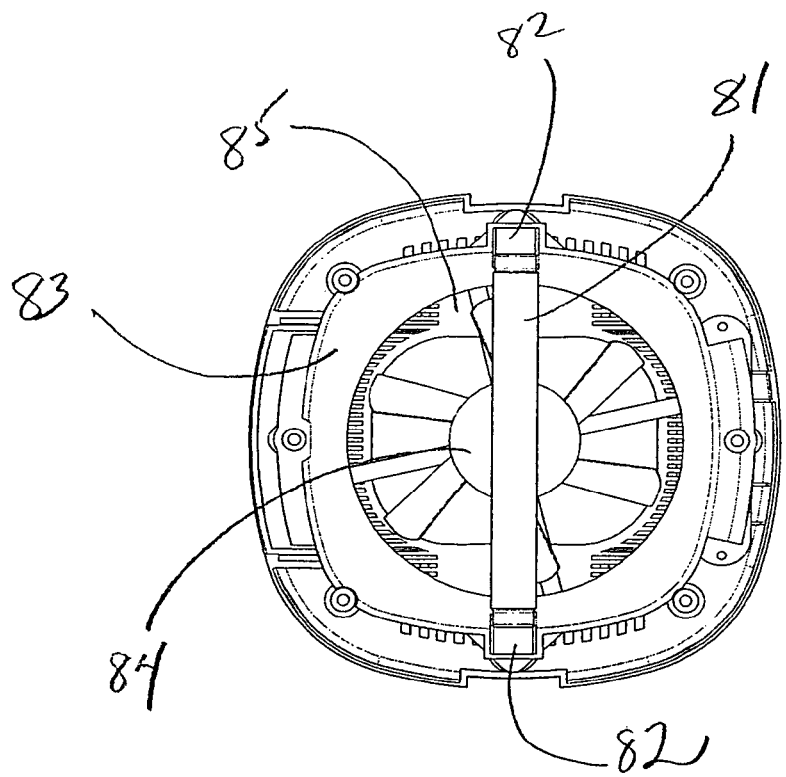
FIG. 10A is a top elevational view FIG. 10 with external housing removed.
Figure 11:
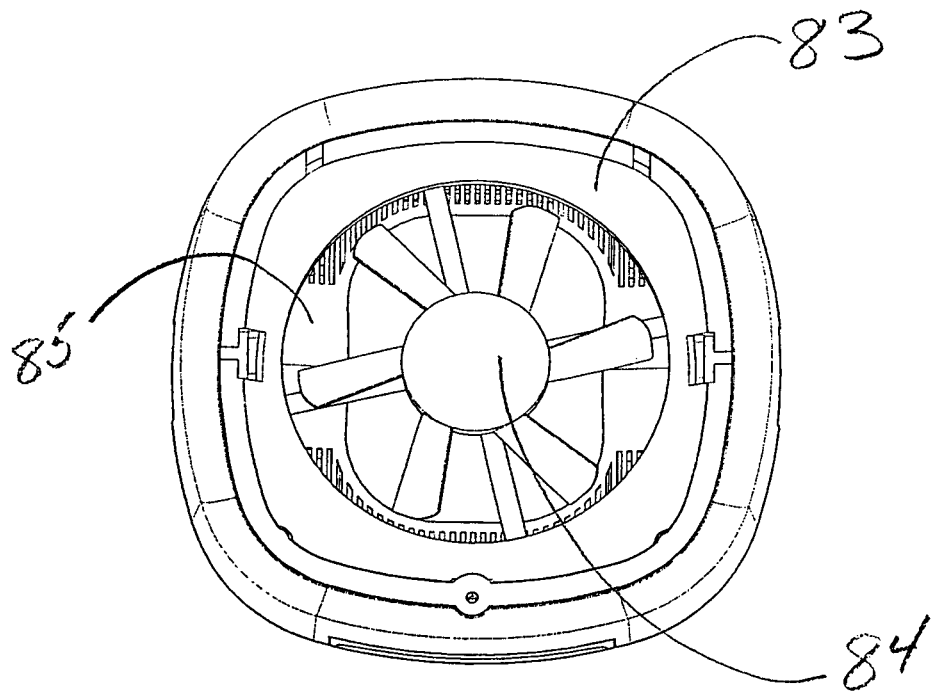
FIG. 11 is a top elevational view of FIG. 10 without the ultraviolet light tube.

Referring to FIG. 10, the light source is an ultraviolet (UV) bulb or tube 81 powered through electrical connections 82. In a preferred embodiment, the light 81 is a black UV light with a wavelength of between 340 and 400 nanometers (NM), with the optimal wavelength at approximately 365 NM.

Figure 12:
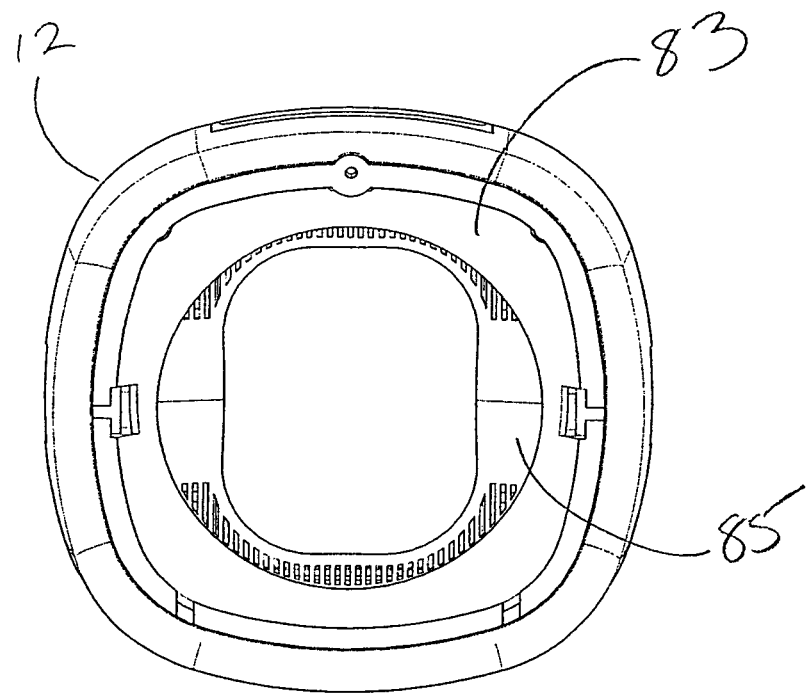
FIG. 12 is a top elevational view of FIG. 11 without the fan element showing the truncated conical mirrored collar disposed thereunder.

Referring in particular to FIG. 12, a fan mounting plate 85 is disposed beneath the fan subassembly 84 and light 81. In the preferred embodiment, the fan mounting plate 85 is vented toward the first side 30 and second side 40 to direct heat and airflow through the first side vent grille 32 and second side vent 42, respectively.

Figure 21:
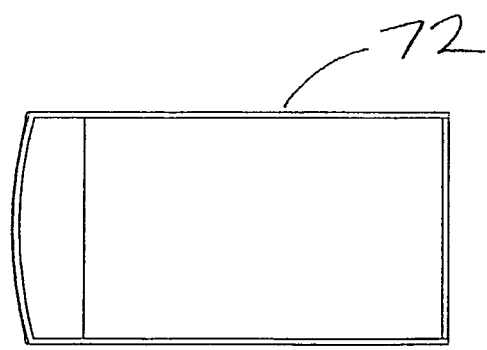
FIG. 21 is a top elevational view of the tray element.

Referring to FIG. 21 in particular, a removable tray 72 holds a disposable sticky pad (not shown) impregnated with nectar or other material as an attractant. The tray 72 slides on rails 74 disposed upon the interior surface of base plate 70. In a preferred embodiment, the surface of bottom plate 70 is corrugated 76.

Figure 21A:
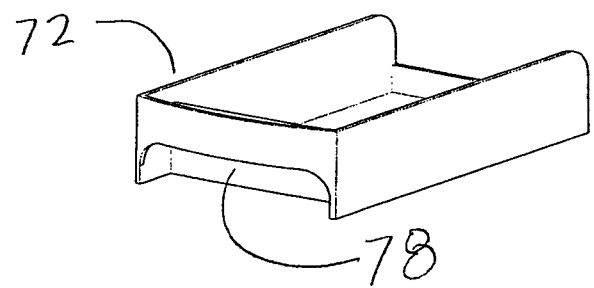
FIG. 21A is a perspective view of the tray of FIG. 21 showing handle on draw.
Figure 21B:
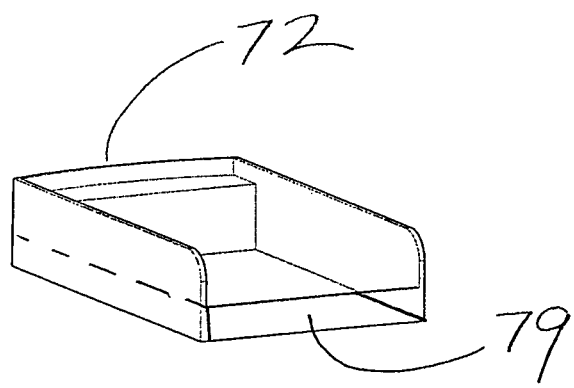
FIG. 21B is rotated perspective view of the tray of FIG. 21A showing storage area for disposable adhesive pad.

Referring to FIG. 21A, tray 72 includes a handle 78 on the draw to extract the tray 72 to remove spent sticky pads. Referring to FIG. 21B, in the preferred embodiment, tray 72 further includes a storage area 79 for convenient access to fresh pads.

Figure 13:
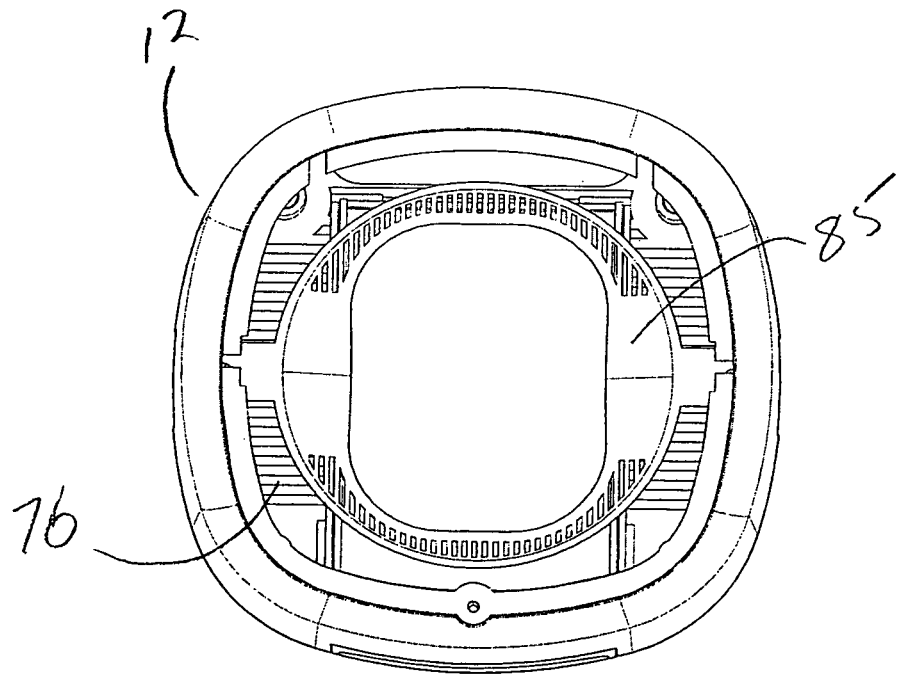
FIG. 13 is a top elevational view of FIG. 12 with reflective collar removed showing vented fan mounting plate with optional front-back placement of vent openings.
Figure 14:
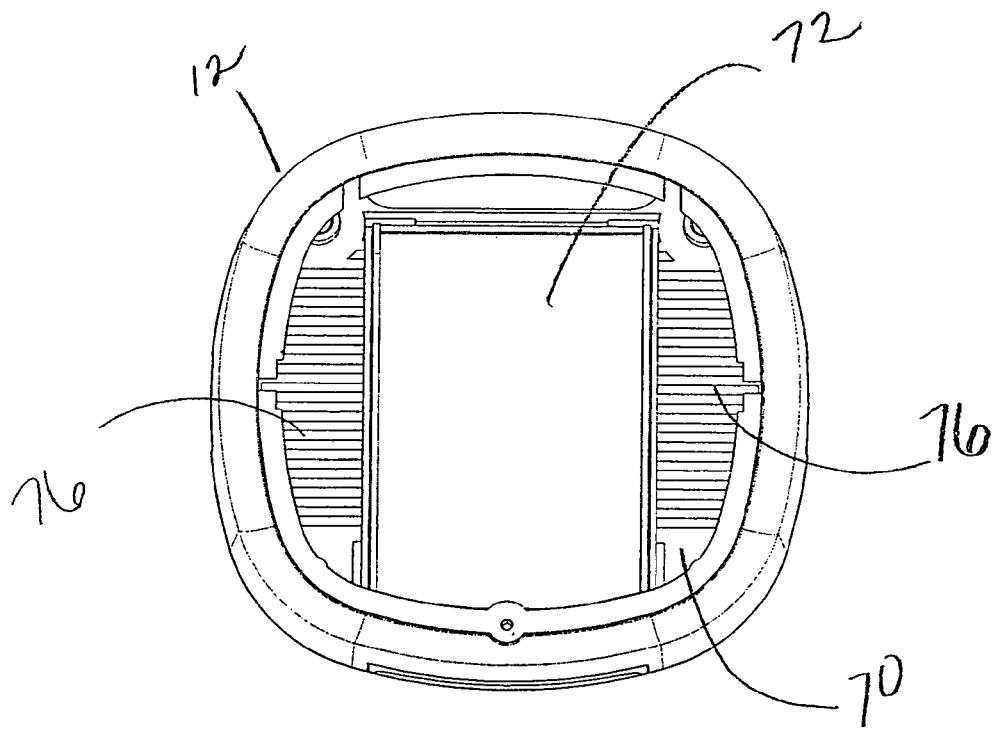
FIG. 14 is a top elevational view of FIG. 13 without vented fan mounting plate showing the tray in place.
Figure 15:
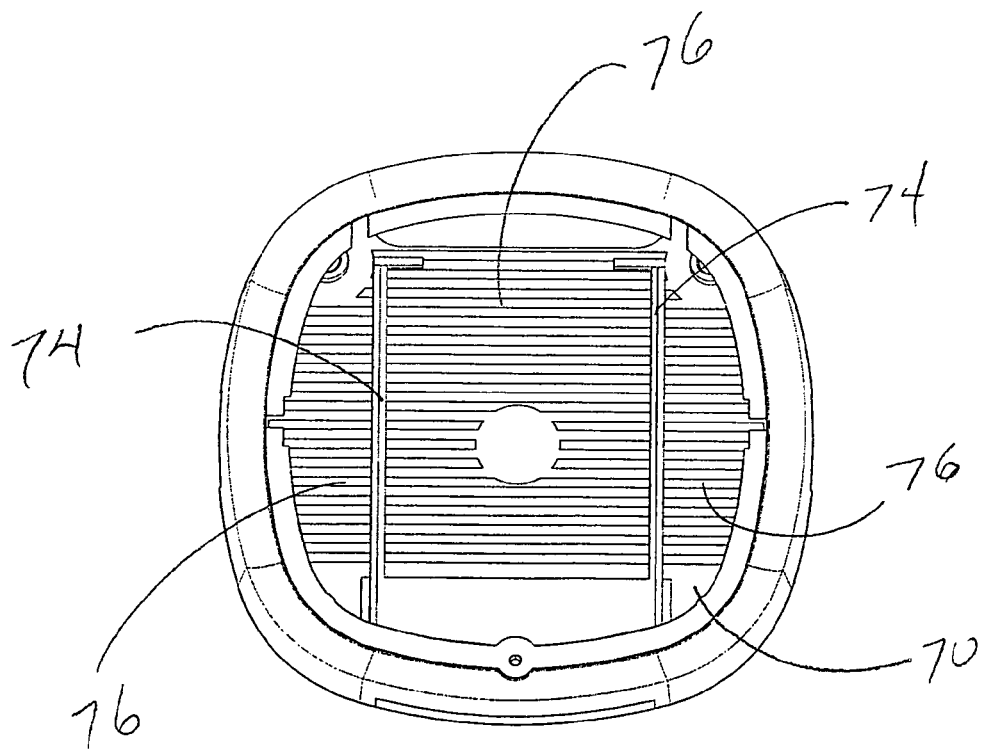
FIG. 15 is a top elevational view of FIG. 14 with tray removed showing the tray guide rails disposed upon the base plate with preferred corrugated surface.
Figure 16:
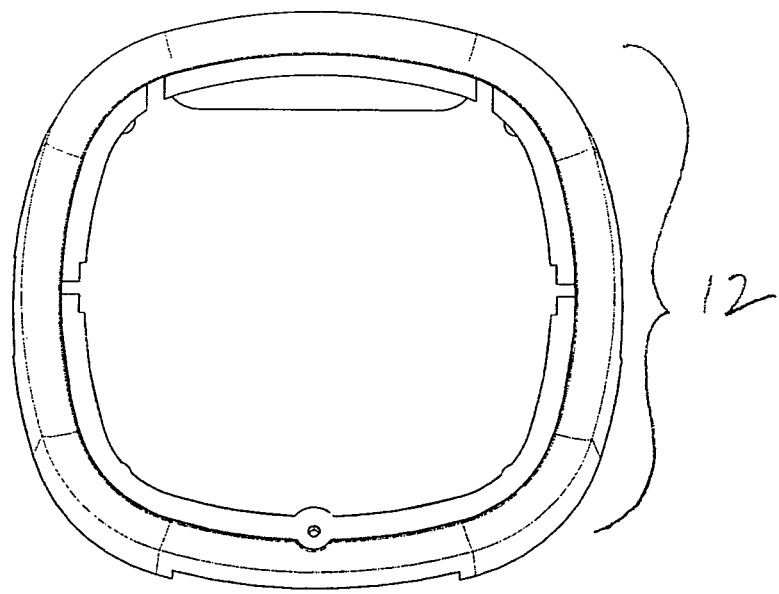
FIG. 16 is a top elevational view of external housing with base plate and internal elements removed.
Figure 17:
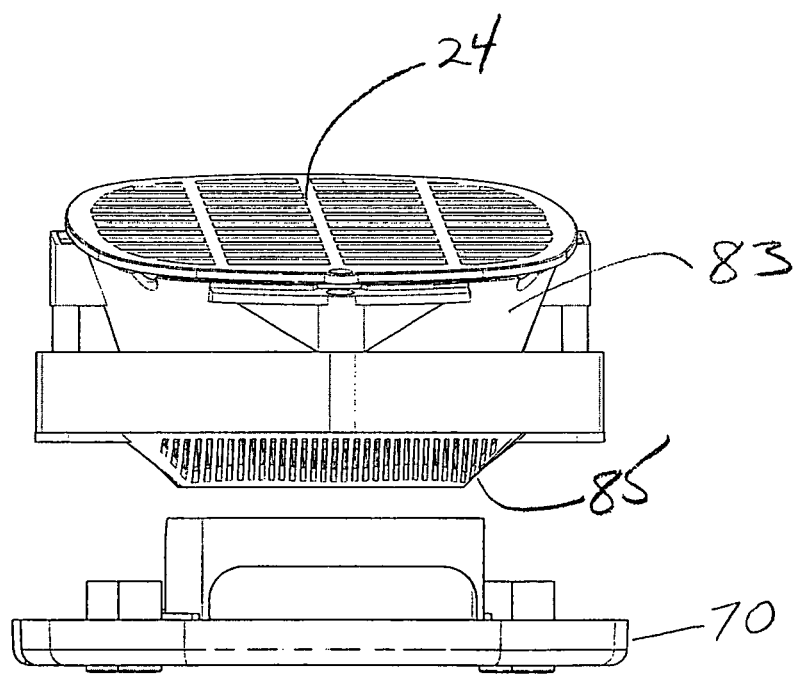
FIG. 17 is a front elevational view with housing removed showing internal elements in relative position to base plate and tray.
Figure 18:
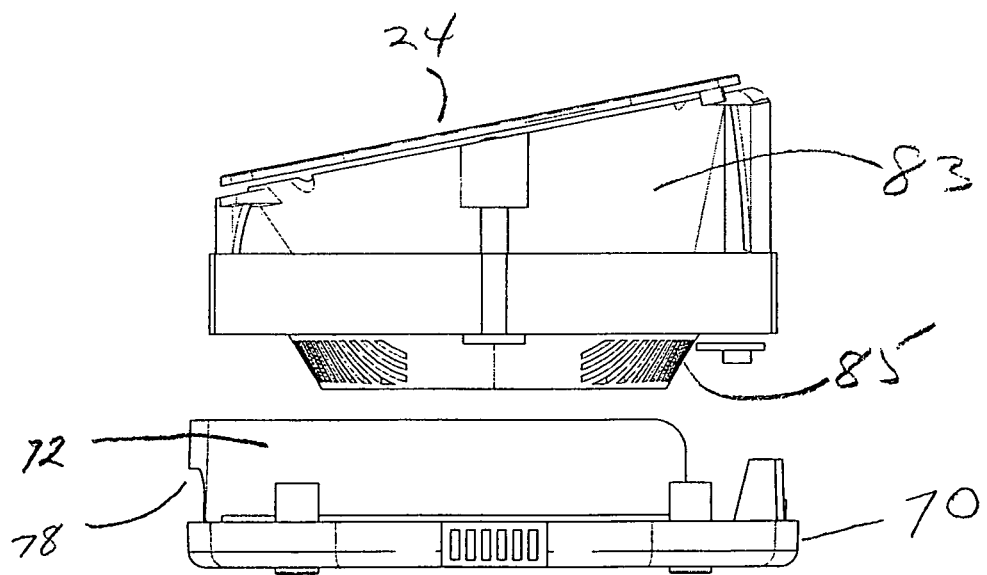
FIG. 18 is a side elevational view of FIG. 17 from second side, further showing fan mounting plate having the optional vent opening placements of FIG. 13.
Figure 19:
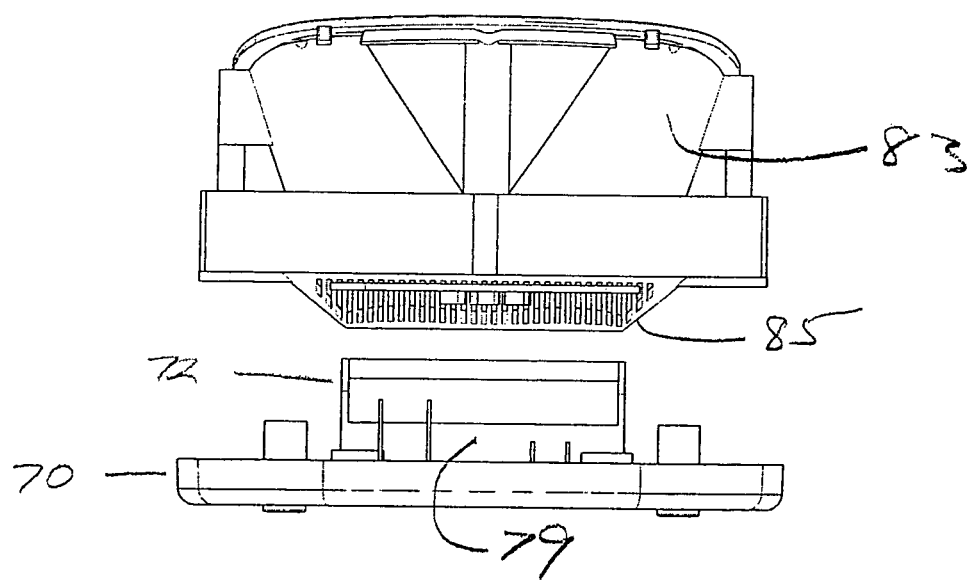
FIG. 19 is a rotated back elevational view of FIG. 18.
Figures 18, 20:
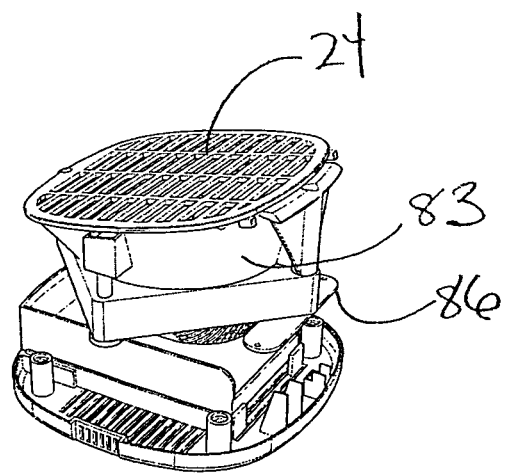
FIG. 20 is a perspective view of FIG. 18 and FIG. 7 with housing removed.

Referring to FIG. 13, the vent openings in fan mounting plate 85 are depicted in an optional configuration. In the preferred embodiment, said vent openings in housing 85 should further be disposed proximate to the external first side exhaust vent 32 and second side exhaust vent 42, respectively. In addition, the vent openings in the fan mounting plate 85 must be dimensioned small enough to prevent flying insects from escaping from housing 12 or bottom plate 70.

In further preferred embodiments, the following features are incorporated. A USB rechargeable battery (not shown) is the power source. A USB interface permits the present invention to be integrated into a mobile, computerized flying insect trap system.

In still further preferred embodiments, the motion detector 86 is disposed upon the top surface 20 of housing 12 so as to extend the detection zone. The apparatus 10 still further includes a cleaning status indicator (not shown) in communication with a pad-surface sensor (not shown). Said sensor preferably detects color change in the pad from unused white to an increasingly gray shade thus allowing optimal pad consumption. Still further, an automatic switch (not shown) is included in addition to the manual on/off switch 62 and motion-detector 86 directed operation. In this way the present invention may be set to turn on automatically based upon a timer (not shown), or upon ambient light through a light sensor (not shown).

Although the invention has been described in detail in the foregoing embodiments for the purpose of illustration, it is to be understood that such detail is solely for that purpose, and that variations can be made therein by those skilled in the art without departing from the spirit and scope of the invention, except as it may be described by the following claims.

What is claimed is:

1. An electronic flying insect trap apparatus, comprising:
a) housing having a bottom plate, a top aperture, first side, a second side, a back side and a front side, said front side having a draw in the bottom portion of said front side of the electronic insect trap apparatus;
b) said top surface of said housing is slanted up from said front side to said back side;
c) said top aperture sized to substantially cover the upper top of said housing located on the top of said housing and said top aperture is in communication with said housing via a gravity lock;
d) said top aperture including at least one access opening sized to provide access by a flying insect into the housing;
e) said first side having a first vent located in the bottom of said first side in communication with said bottom plate;
f) said second side having a second vent located in the bottom of said first side in communication with said bottom plate;
g) at least one black ultraviolet light source mounted within the housing below said top aperture in said housing;
h) a truncated conical collar mounted within said housing below said light, top of said collar sized to be in communication with an outer rim of said top aperture and bottom of said collar sized to be in communication with an open top of a fan;
i) said collar has a mirrored finish;
j) said fan disposed within said housing below said collar upon a fan mounting plate disposed with a plurality of vents;
k) at least one tray containing sticky adhesive disposed on the upper surface of a disposable sheet mounted within said housing below said fan, said tray sized to allow air to flow out of said housing through said first side vent and said second side vent;
l) said adhesive impregnated with nectar scent;
m) said bottom plate sized to substantially cover the bottom of said housing, said top aperture in communication with the lower surface of said housing;
n) at least one motion detector, said detector in communication with said fan allowing activation of said fan when a flying insects are proximal to said top aperture;
o) at least one electrical transformer system mounted within said housing, said system to convert electric current from a universal serial bus charging system into an appropriate electric form to power said light and said fan, and said system is in electrical communication with said light, said fan and said at least one motion detector; and
p) a control switch positioned between said charging system source and said electrical transformer system and said control switch comprises at least three of the following positions: an on position, an off position and an automatic position.

2. The apparatus of claim 1, wherein the wavelength of said ultraviolet light is between 340 and 400 nanometers.

3. The apparatus of claim 2, wherein the wavelength of said ultraviolet light is approximately 365 nanometers.

4. The apparatus of claim 1, wherein said vents in said fan mounting plate are dimensioned to trap flying insects from escape.

5. The apparatus of claim 1, wherein the housing is curvate.

* * * * *